United States Patent [19]

Sturgis

[11] Patent Number: 5,131,425

[45] Date of Patent: Jul. 21, 1992

[54] GAS PRESSURE REGULATOR WITH CHECK VALVE

[76] Inventor: Malcolm B. Sturgis, 6227 Rosebury Ave., St. Louis, Mo. 63105

[21] Appl. No.: 755,122

[22] Filed: Sep. 5, 1991

[51] Int. Cl.$^5$ ............................................. G05D 16/06
[52] U.S. Cl. ............................. 137/116.5; 137/614.2; 137/505.46; 137/855
[58] Field of Search ............. 137/614.2, 116.5, 505.46, 137/505.47, 855, 543.21

[56] References Cited

U.S. PATENT DOCUMENTS

| | | | |
|---|---|---|---|
| 1,898,226 | 2/1933 | Taylor | 137/614.2 |
| 2,867,234 | 1/1959 | Billington | 137/505.46 X |
| 2,899,973 | 8/1959 | Carlson . | |
| 2,930,040 | 3/1960 | Cowan | 137/543.21 X |
| 3,207,175 | 9/1965 | Pauly | 137/505.46 |
| 3,339,581 | 9/1967 | Couriot | 137/505.47 X |
| 3,387,629 | 6/1968 | Ellis . | |
| 3,812,878 | 5/1974 | Bird | 137/855 X |
| 4,026,314 | 5/1977 | Turner et al. . | |
| 4,133,343 | 1/1979 | Carroll | 137/614.20 X |
| 4,171,004 | 10/1979 | Cerrato | 137/116.5 X |
| 4,491,149 | 1/1985 | Trinkwalder . | |

*Primary Examiner*—Alan Cohan
*Attorney, Agent, or Firm*—Senniger, Powers, Leavitt & Roedel

[57] ABSTRACT

This invention represents an improvement in a gas pressure regulator of the type comprising a body having an inlet, an outlet, a gas flow passage in the regulator body interconnecting the inlet and outlet, and a regulator mechanism in the valve body including a relief valve which is set to open when the pressure of the gas in the flow passage exceeds a predetermined pressure. The improvement comprises a valve seat in the gas flow passage immediately upstream from the outlet in the body of the regulator, and a check valve member in the gas flow passage disposed between the valve seat and the outlet in the body of the regulator, the check valve member being movable between an open position in which it is spaced from the valve seat to permit flow in downstream direction from the inlet to the outlet past the valve seat, and a closed position in which the check valve member prevents reverse flow in upstream direction past the valve seat. In the event gas is introduced into a downstream line to test the downstream gas line and its connection to the outlet of the regulator body, the check valve member closes to prevent opening of the relief valve even if the pressure of the gas introduced into the downstream line for testing is greater than the pressure at which the relief valve in the regulator is set to open.

10 Claims, 2 Drawing Sheets

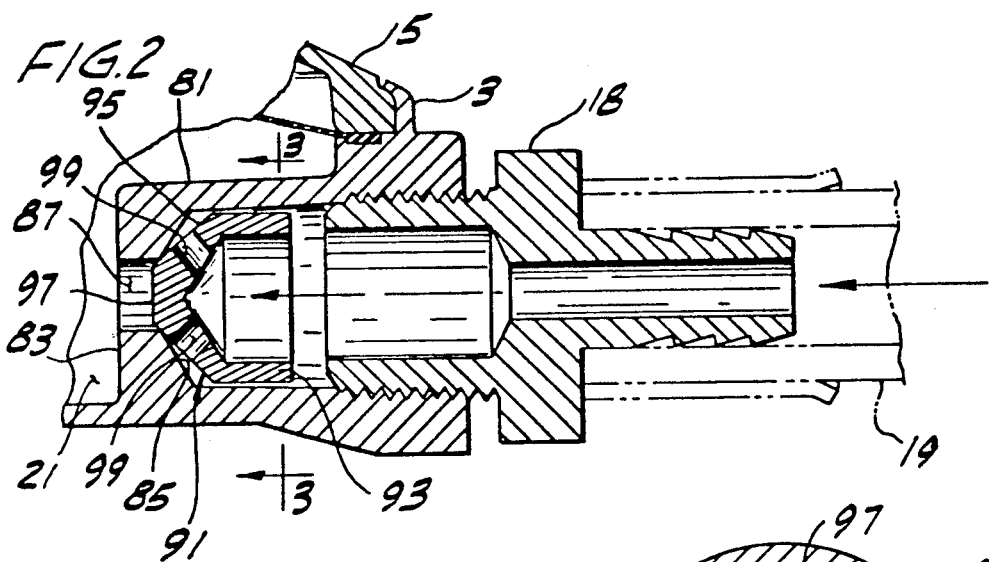
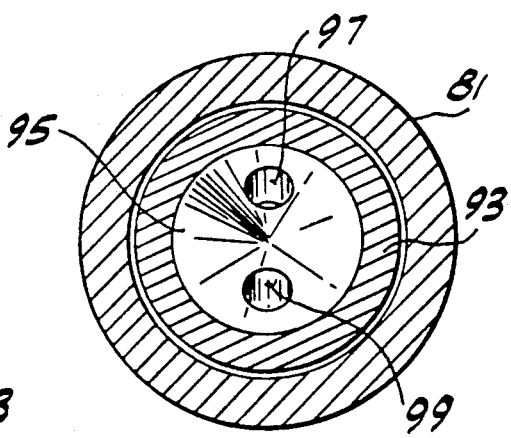
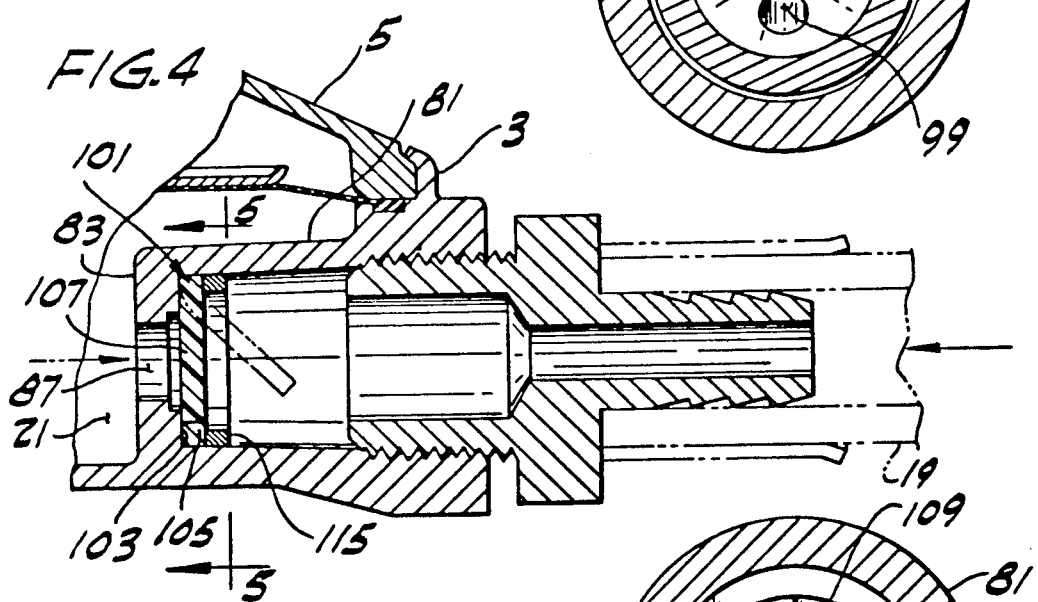
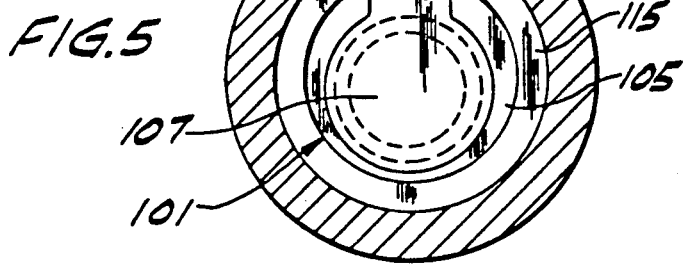

GAS PRESSURE REGULATOR WITH CHECK VALVE

BACKGROUND OF THE INVENTION

This invention relates generally to gas pressure regulators and, more particularly, to a gas pressure regulator which is designed to permit testing of the low-pressure gas line and its connection to the regulator outlet for leaks at pressures higher than the relief valve pressure setting of the regulator.

Before using a pressure regulator assembly, it is desireable (even required in certain instances) to check the low-pressure gas line (downstream from the regulator) and its connection to the outlet of the regulator for gas leakage. This is typically done by introducing high-pressure gas into the downstream line. However, in conventional regulators high pressures cannot readily be used to test this connection, since such pressures are typically in excess of the pressure at which the relief valve in the regulator is set to open to vent the regulator.

Reference may be made to U.S. Pat. Nos. 4,171,004 and 3,339,581 for pressure regulators generally in the field of this invention.

SUMMARY OF THE INVENTION

Among the several objects of this invention may be noted the provision of an improved gas pressure regulator, the outlet connection of which may be tested at high pressures without actuating the relief valve; the provision of such a regulator which is formed with an integral check valve immediately upstream from the outlet of the regulator for enabling such high-pressure testing; and the provision of such a regulator which is simple in design for economical construction.

In general, this invention involves an improvement on a conventional pressure regulator of the type comprising a body having an inlet formed for connection to an upstream gas line for flow of gas under pressure into the regulator, an outlet formed for connection to a downstream gas line for flow of gas under pressure out of the regulator, a gas flow passage in the regulator body interconnecting the inlet and outlet, and regulator means for regulating the pressure of the gas flowing in downstream direction through said passage to said downstream gas line. The regulator means includes a relief valve adapted to open when the pressure in the gas flow passage exceeds a predetermined pressure. The improvement comprises a valve seat in the gas flow passage immediately upstream from the outlet in the body of the regulator, and a check valve member in the gas flow passage disposed between the valve seat and the outlet in the body of the regulator. The check valve member is movable between an open position in which it is spaced from the valve seat to permit flow in downstream direction from the inlet to the outlet past the valve seat, and a closed position to prevent reverse flow in upstream direction past the valve seat. The arrangement is such that, in the event gas is introduced into the downstream line to test the downstream gas line and its connection to the outlet of the regulator body, the check valve member is adapted to close to prevent opening of the relief valve even if the pressure of the gas introduced into the downstream line for testing is greater than the predetermined pressure at which the relief valve in the regulator is adapted to open.

Other objects and features will be in part apparent and in part pointed out hereinafter.

BRIEF DESCRIPTION OF THE DRAWINGS

FIG. 2 is a view showing the check valve closed to permit high-pressure testing of the outlet connection;

FIG. 3 is an enlarged section taken on line 3—3 of FIG. 2;

FIG. 4 is a view similar to FIG. 2 showing a check valve of alternative design; and FIG. 5 is an enlarged section taken on line 5—5 of FIG. 4.

Corresponding parts are designated by corresponding reference numbers throughout the several views of the drawings.

DETAILED DESCRIPTION OF THE PREFERRED EMBODIMENT

Figure 1:
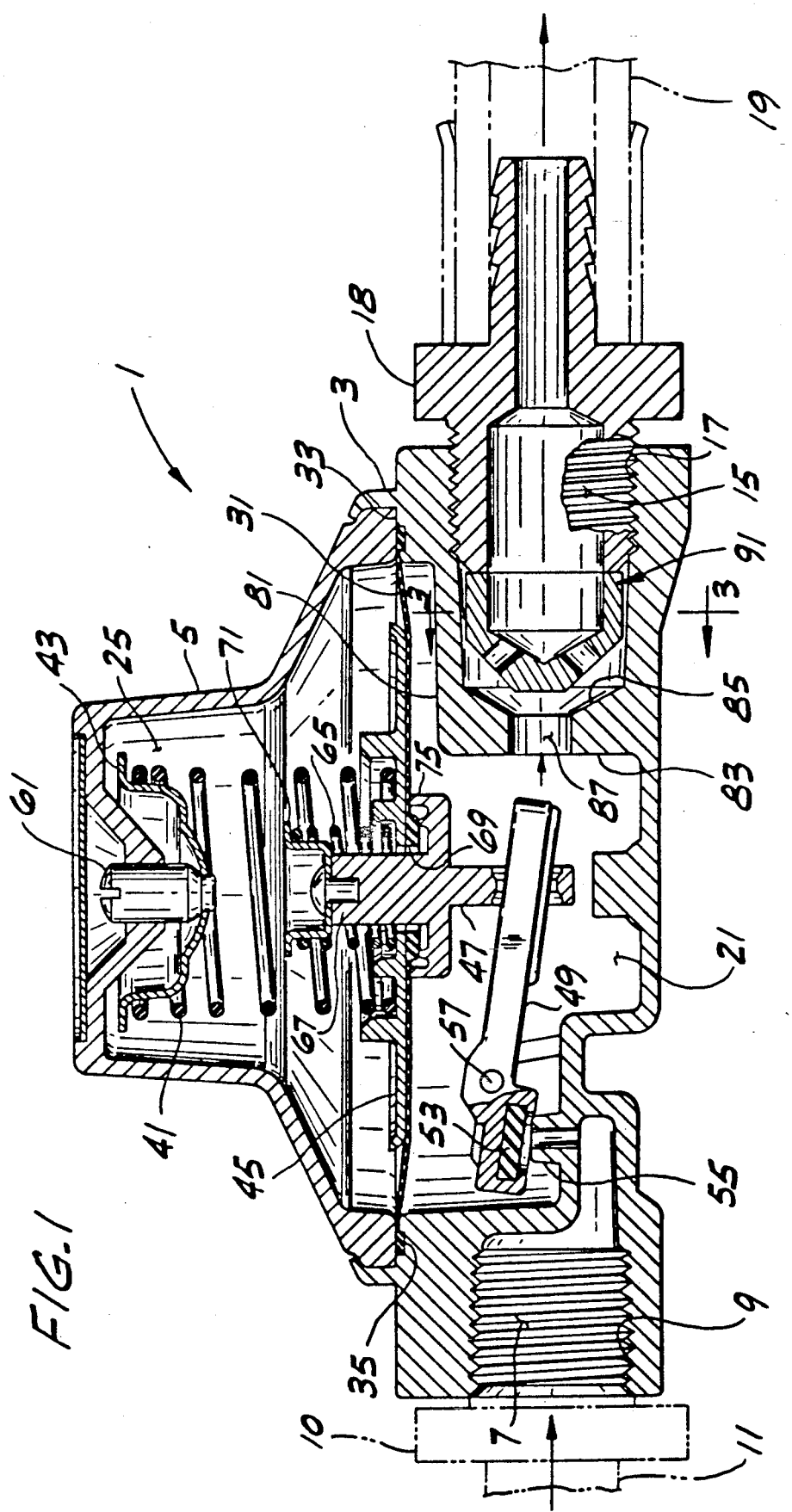
FIG. 1 is a cross-sectional view of a gas pressure regulator incorporating a check valve in accordance with this invention, the check valve being shown open to permit the regulated flow of gas through the regulator.

Referring now to the drawings, and first to FIG. 1, a gas pressure regulator is designated in its entirety by the reference numeral 1. The regulator comprises a body 3 of unitary construction (e.g., cast metal construction) and a bonnet 5, also of unitary construction, removably secured to the body. The regulator body 3 has a cylindric inlet 7 formed with internal threads 9 for connection via a threaded connector 10 to a high-pressure upstream gas line 11 for flow of gas at relatively high pressure into the regulator, a cylindric outlet 15 formed with internal threads 17 for connection via a threaded connector 18 to a lower-pressure downstream gas line 19 for flow of gas under pressure out of the regulator, and a gas flow passage 21 interconnecting the inlet 7 and outlet 15 for flow of gas through the regulator from left to right as viewed in FIG. 1. The bonnet 5 defines a chamber 25 above the regulator body 13 which is suitably vented to atmosphere and which is separated from the flow passage 21 by a flexible diaphragm 31 clamped against an annular shoulder 33 on the regulator body by the lower edge of the bonnet, the diaphragm having a depending peripheral lip 35 received in a groove in the shoulder to hold the diaphragm in place.

A control spring 41 in the bonnet 5 is held compressed between a spring retainer 43 on the bonnet and a backing plate 45 on the upper side of the diaphragm 31. The spring pressure thus generated pushes the diaphragm and a valve actuator 47 mounted at the center of the diaphragm in downward direction to pivot a valve arm 49 connected to the lower end of the actuator in clockwise direction. This causes a valve member 53 at one end of the valve arm (its left end as viewed in FIG. 1) to lift out of engagement with a valve seat 55 formed as an integral part of the regulator body 3 adjacent the inlet 7, thereby permitting flow of gas from the high-pressure line 11 into the flow passage 21. As gas flows into the passage, the pressure under the diaphragm 31 increases and eventually forces the diaphragm and the valve actuator 47 upward against the pressure of the control spring 41, causing the valve arm 49 to pivot at 57 in counterclockwise direction to bring the valve member 53 on the valve arm into sealing engagement with the valve seat 55 to shut off further flow therepast. An adjustment screw 61 threaded in the top of the bonnet 5 into engagement with the spring retainer 43 is used to compress the control spring so as to increase the loading on the diaphragm when the screw is rotated in one direction. Rotation of the screw 61 in the opposite direction will relieve some of the pressure on the diaphragm 31, the arrangement being such that the spring 41 determines, within certain limits, the amount of pressure that must build up in the flow passage 21 before further flow is shut off.

A smaller relief spring 65 surrounds a valve stem 67 on the valve actuator extending up through a central opening 69 in the diaphragm. This relief spring 65 reacts at its lower end against the backing plate 45 and at its upper end against a spring retainer 71 secured to the top of the valve stem. The relief spring urges the actuator 47 upwardly relative to the diaphragm 31 so as to maintain a flange 75 adjacent the bottom of the actuator in sealing engagement with the underside of the diaphragm to close off opening 69. It will be understood, therefore, that the actuator 47 and flange 75 act as a relief valve in the event the pressure in the flow passage 21 exceeds a predetermined pressure. In such case, since the diaphragm 31 will flex upward and the valve arm 49 will pivot to close against the valve seat 55, any further increase in pressure in the flow passage will cause the diaphragm to be lifted off the flange 75, thereby allowing gas to escape through the gap between the valve stem 67 and the edge of the opening 69 in the diaphragm into the low-pressure chamber 25 for venting to atmosphere.

In accordance with this invention, the regulator body 3 has an integral one-piece tubular extension 81 extending upstream from the internally threaded outlet 15 of the body. This extension 81 has an inwardly projecting annular radial flange 83 at its upstream end which forms a conical valve seat 85 in the flow passage 21 immediately upstream from the outlet 15 of the regulator body (the flange 83 also defines an opening 87 through the valve seat constituting part of the flow passage 21 through the regulator). A check valve generally indicated at 91 is disposed in the tubular extension 81 between the valve seat 85 and the outlet 15, the valve being movable between an open position (FIG. 1) in which it is spaced from the valve seat to permit flow in downstream direction from the inlet 7 to the outlet 15, and a closed position (FIG. 2) in which the check valve 91 is sealingly engageable with the valve seat 85 to prevent reverse flow in upstream direction therepast.

In the embodiment shown in FIGS. 2 and 3, the check valve 91 comprises a poppet valve member freely slidable in the tubular extension 81 and having a tubular valve body 93 with a cross-sectional shape generally conforming to the cross-sectional shape of the flow passage 21 immediately downstream from the check valve seat 85, and a conical head 95 at the upstream end of the valve body 93 having a passage-free, relatively flat nose 97. The conical outer surface of the head 95 has passaging therethrough (e.g., a plurality of openings as indicated at 99 in FIGS. 2 and 3) adjacent the nose 97 for permitting flow in downstream direction when the poppet valve member 91 is in its stated open position. When the poppet valve member moves to its closed position, the conical surface of the head 95 immediately adjacent the nose 97 is adapted to sealingly engage the valve seat 85 so that flow though the openings 99 is blocked to prevent reverse flow past the valve seat. The body 93 of the poppet valve member preferably has a generally close clearance fit with the inside wall (or walls) of the tubular extension 81. Movement of the poppet valve member 91 in downstream direction to its open position is limited by engagement of the valve member with the upstream end of connector 18 threaded in outlet 15.

In the embodiment shown in FIGS. 4 and 5, the check valve comprises a resilient flapper valve 101 in the tubular extension 81 immediately downstream from the check valve seat 103. This flapper valve has an annular edge margin 105 overlapping the radial flange 83 forming the valve seat 101, and a flapper member 107 hingedly connected at 109 to the edge margin 105 for deflecting (swinging) between an open position (shown in phantom lines in FIG. 4) in which it is spaced from the valve seat to permit flow therepast and a closed position (shown in solid lines in FIG. 4) in which it is sealingly engageable with the valve seat to block reverse flow (i.e., flow in upstream direction) therepast. The resilience of the hinge connection urges the flapper member 107 toward its closed position. An annular retainer 115 fitted in the tubular extension 81 immediately downstream from the flapper valve 101 engages the annular edge margin 105 of the flapper valve to hold the valve in proper position adjacent the valve seat 103.

During normal operation of the pressure regulator, high-pressure gas at the inlet 7 of the regulator body 3 will force the valve member 53 on valve arm 49 upwardly away from the valve seat 55 to permit flow through the flow passage 21, past the check valve 91 or 101 which is designed to permit essentially unrestricted flow in downstream direction, and thence to the downstream gas line 19. The pressure of the gas will increase until such time as the diaphragm 31 and valve actuator 47 move up against the bias of the control spring 41 a distance sufficient to cause the valve arm 49 to pivot counterclockwise to close the valve member 53 against the valve seat 55 to shut off further flow.

As mentioned earlier hereinabove, the check valve feature of this invention allows the downstream gas line 19 and its connection to the outlet 17 of the regulator to be tested under high pressure for leaks. This is not generally feasible in conventional regulators since such high-pressure testing automatically causes the relief valve of the pressure regulator to open, thereby reducing the pressures needed to test the outlet connection. However, in the present design, high-pressure testing is permissible due to the unique check valve arrangement. High-pressure gas (e.g., up to 350 psi gas) is simply introduced into the downstream gas line 19 for the purpose of testing the outlet connection, at which time the check valve 91 or 101 in the regulator will close to prevent gas from flowing upstream past the check valve seat (85 or 103). Thus the diaphragm 31 is isolated from such high pressures so that the relief valve will not open even though the test pressures exceed the predetermined pressure at which the relief valve is set to open. The fact that the check valve is upstream from the outlet of the regulator is advantageous because this allows the outlet connection to be tested under high pressure.

While two preferred check valve designs (91, 101) are disclosed herein, it will be understood that other designs may also be suitable.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a gas pressure regulator comprising a body having an inlet formed for connection to an upstream gas line for flow of gas under pressure into the regulator, an outlet formed for connection to a downstream gas line for flow of gas under pressure out of the regulator at a reduced pressure, a gas flow passage in the regulator body interconnecting said inlet and outlet, and regulator means in the valve body for regulating the pressure of the gas flowing in downstream direction through said passage to said downstream gas line, said regulator means including a relief valve adapted to open when the pressure of the gas in said flow passage exceeds a predetermined pressure, the improvement comprising a valve seat located in the body in said gas flow passage immediately upstream from the outlet in the body of the regulator and downstream from the relief valve, and a fluid pressure actuated check valve located in the body in said gas flow passage disposed between the valve seat and the outlet in the body of the regulator and downstream from the relief valve, said check valve being movable between an open position in which it is spaced from the valve seat to permit flow in downstream direction form the inlet to the outlet past the valve seat, and a closed position in which the check valve prevents reverse flow in upstream direction past the valve seat whereby, in the event gas is introduced into the downstream lie to test the downstream gas line and its connection to the outlet of the regulator body, said check valve is adapted to close to prevent opening of the relief valve even if the pressure of the gas introduced into said downstream lien for testing is greater than said predetermined pressure at which the relief valve in the regulator is adapted to open.

2. In a gas pressure regulator as set forth in claim 1 wherein said valve seat and the regulator body are of integral one-piece construction.

3. In a gas pressure regulator as set forth in claim 1 wherein the outlet in said regulator body has internal threads for making a threaded connection to said downstream gas line, said valve seat and check valve being disposed in said passage upstream from said threads.

4. In a gas pressure regulator as set forth in claim 1 wherein said check valve comprises a poppet valve member slidable in the passage in the regulator body immediately downstream from the valve seat, said poppet valve member having a close clearance fit with a wall of the passage.

5. In a gas pressure regulator as set forth in claim 4 wherein said poppet valve member comprises a hollow valve body having a cross-sectional shape generally conforming to the cross-sectional shape of the passage immediately downstream from the valve seat, and a head at the upstream end of the valve body sealingly engageable with the valve seat, said head having passaging therethrough configured for permitting downstream flow through the poppet valve member when the poppet valve member is in its said open position.

6. In a gas pressure regulator as set forth in claim 5 wherein the head of the poppet valve member has a passage-free nose for blocking flow through said passage when the poppet valve member is closed, and openings in the head adjacent the nose for permitting flow through the passage when the poppet valve member is open.

7. In a gas pressure regulator as set forth in claim 5 wherein said regulator body has an integral one-piece tubular extension extending in upstream direction from said outlet and defining a portion of said passage and said valve seat, said poppet vale member being slidable in said tubular extension between its said open and closed positions.

8. In a gas pressure regulator as set forth in claim 1 wherein said check valve comprises a resilient flapper valve in the passage in the regulator body immediately downstream from the valve seat, said flapper valve being adapted to resiliently deflect from a closed position in which it is sealingly engageable with the valve seat to block flow therepast to an open position in which it is spaced form the valve seat to permit flow therepast.

9. In a gas pressure regulator as set forth in claim 8, further comprising an annular retainer in said passage immediately downstream form said flapper valve for holding said flapper valve in position adjacent said valve seat.

10. In a gas pressure regulator as set forth in claim 9 wherein said regulator body has an integral one-piece tubular extension extending in upstream direction from said outlet and defining a portion of said passage and said valve seat, said flapper valve and retainer being disposed in said tubular extension.

* * * * *

UNITED STATES PATENT AND TRADEMARK OFFICE
CERTIFICATE OF CORRECTION

PATENT NO. : 5,131,425
DATED : July 21, 1992
INVENTOR(S) : Malcolm B. Sturgis It is certified that error appears in the above-identified patent and that said Letters Patent is hereby corrected as shown below:

Column 5, claim 1, lines 26-27, "direction form the inlet" should read ---direction from the inlet---.

Column 5, claim 1, lines 30-31, "downstream lie to" should read ---downstream line to---.

Column 5, claim 1, line 35, "downstream lien" should read ---downstream line---.

Column 6, claim 7, line 25, "poppet vale member" should read ---poppet valve member---.

Column 6, claim 8, line 35, "spaced form" should read ---spaced from---.

Signed and Sealed this

Twenty-fourth Day of August, 1993

Attest:

BRUCE LEHMAN

*Attesting Officer*  *Commissioner of Patents and Trademarks*